United States Patent Office 3,266,966
Patented August 16, 1966

3,266,966
CAST PLASTIC SHEETS OR FILMS
Albert George Patchell, Welwyn Garden City, England, assignor to T. J. Smith & Nephew Limited, Hull, England, a British company
Filed Mar. 22, 1960, Ser. No. 16,670
Claims priority, application Great Britain, Mar. 23, 1959, 9,955/59
4 Claims. (Cl. 156—167)

This invention relates to cast plastic sheets or films of polyvinyl chloride, and has for its object to form such sheets or films of a porous or microporous nature and to reinforce them in the process of manufacture, to compensate at least partially for any physical weaknesses due to such porosity.

According to the present invention, a paste of the polyvinyl chloride (with or without a thinner) is laid in the form of a fine-line openwork pattern, on to a suitable carrier, for instance of tough paper, textile, steel or otherwise, which may be in the form of an endless or other travelling band, and on this patterned spread is cast a film of solvent thinned paste of the same or a compatible polyvinyl chloride which paste includes a soluble or other pore-forming agent (for example sodium chloride) of adequate particle size, to be leached or washed out after gelling, or a "blowing" agent, to leave pores of required size and to become effective at, or approximately at, the gelling temperature.

The film of solvent thinned paste may be cast onto the fine-line openwork patterned spread on the carrier in the condition of the said spread as it is laid, or after it has had a preliminary heating at a suitable temperature to evaporate off the thinner, or after it has had a pre-gelling heat treatment to bring it into a physical condition ready for gelling, or after it has been subjected to a gelling heat treatment.

The depth of the film of paste having the pore-forming agent, which is flowed on to the carrier, may equal the "height" of the pattern or be greater than this height. In any case, it will be realised that the flowed-on paste covers and enters and wholly or partially fills all the spaces of the pattern and readily adheres to and includes the pattern in its substance, the pattern in some cases projecting on one surface, or being enclosed by and within the flowed-on paste, and although possibly not visible yet remaining distinct.

For the gelling operation, according to the invention it is preferred to subject the reinforced sheet or film thus formed to successive heat treatments, each at a higher temperature than the preceding, first to remove any volatile thinner, second to give the sheet or film a pre-gelling treatment to bring it into a state ready for gelling, and third and last to fully gel and sheet or film and to decompose the blowing agent if employed to form the pores.

Finally, the sheet or film is allowed to cool, before or after stripping from the carrier, depending on the particular circumstances. If a soluble or other pore-forming agent has been employed for forming the pores, this is now leached or washed out.

The pattern of paste on the carrier may be laid by many methods, for instance the pattern, such as diagonally crossing lines, may be cut as the grooved surface of a roller, the grooves of which are fed with the paste which is then transferred to the surface of the carrier by rotating the roller in pressure contact therewith.

In another method, an extrusion head for the paste operates in conjunction with the travelling carrier. This head is supplied with the paste under pressure and has a plurality of similar spaced nozzles with fine apertures on its underside which open just above the surface of the carrier. In one arrangement, the extrusion head extends transversely across the travelling band and remains fixed, and when the band travels the pattern consists of parallel spaced lines of the paste extending longitudinally of the band. In another construction, the extrusion head is disposed longitudinally in relation to the travelling band with the nozzles spaced one behind the other, and in a preferred arrangement the two outermost nozzles are spaced apart twice the transverse width of the film to be cast. When operating, whilst the carrier band is travelling, the head is reciprocated slowly transversely across the carrier band in such manner that lines of paste crisscross on the surface of such carrier band, forming an openwork "diamond" pattern.

In order that the invention may be better understood, it will now be described with reference to the accompanying diagrammatic drawings which are given by way of example only and in which.

Figure 1:
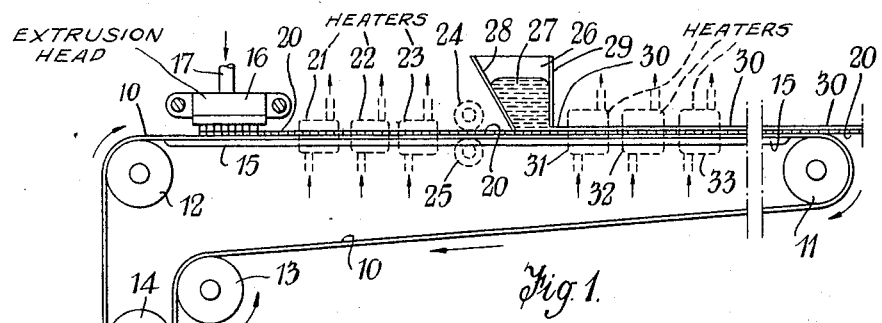
FIG. 1 is a diagrammatic side elevation of one form of apparatus for carrying the invention into effect.
Figure 2:
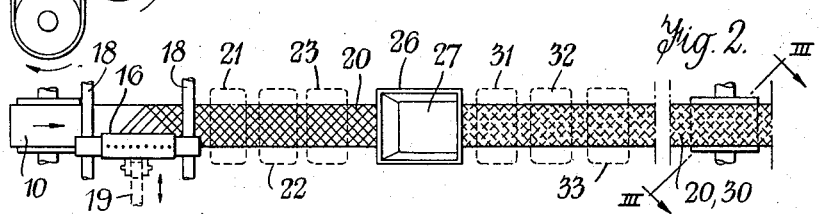
FIG. 2 is a plan view of FIG. 1, FIGS. 3, 4 and 5 are greatly enlarged cross-sectional elevations of portions of reinforced cast plastic sheets made by the process of, and according to the invention.

In the method of manufacturing reinforced cast plastic sheets or films of polyvinyl chloride according to the invention, shown in FIGS. 1 and 2, an endless travelling carrier 10 of sheet metal or otherwise is employed, which passes around guide rollers 11, 12 and 13 and is driven in the direction of the arrows by the driving roller 14. The upper run of this carrier which extends between the rollers 11 and 12, is located in a horizontal plane and for the greater part of its length is supported by a fixed table 15.

Located above the feeding end of the apparatus adjacent the guide roller 12, there is mounted an extrusion head 16 which is supplied with a paste under pressure of the polyvinyl chloride of a suitable consistency through the inlet pipe 17. On the underside this head has a plurality of similarly spaced nozzles with fine apertures which open just above the surface of the carrier 10, as indicated by the short vertical lines in FIG. 1 and by dots in FIG. 2. This line of jets comes parallel with the edge of the carrier, and the extrusion head is mounted to reciprocate back and forth over the surface of the carrier upon fixed parallel guides 18 in a uniform manner by a connecting rod 19 in connection with a suitable cam, crank or otherwise. The stroke has the width of the carrier or slightly less than such width and as a consequence with the traveller in the drawings moving from the left to the right it will be appreciated that by suitably timing the reciprocations of the feeder box with the travel of the carrier, a pattern of diagonally crossing lines of the polyvinyl chloride is laid on the carrier, as indicated by the reference numeral 20, FIGS. 1 and 2.

In the travel of this pattern moving with the carrier, after it leaves the extruder head, according to the exact nature of the process being carried out, it can pass through a preliminary heating means 21 to remove any thinning solvent and then, if desired, through a further heating means 22 where it can be subjected to a pre-gelling temperature, and finally to another heating means 23 where it is subjected to a gelling temperature. However, it should be understood that these three heating zones can be varied according to the nature of the mix of the paste and according to whether it is desired to gel the pattern of lines before it passes along the apparatus for further treatment. Whatever the exact arrangement, however, if desired after leaving this heating zone the pattern of lines of the polyvinyl chloride paste laid on the carrier may be subjected to a slight nipping action by co-operating nipping rollers 24 and 25 arranged above the pattern of lines and below the carrier. The table 15 can be slotted in this position to allow the nipping roller 25 to press against the underside of the carrier.

The diameter of the "lines" or filaments of the reinforcement could be 0.010" but, of course, the invention is not limited to this size as it could be greater or less.

The pattern of lines of the polyvinyl chloride paste now passes beneath a hopper 26 having a paste 27 therein of the same or of a compatible polyvinyl chloride or other polymer or co-polymer (with or without a thinner) which paste includes a soluble or other pore-forming agent (for example sodium chloride) of adequate particle size, to be leached or washed out after gelling, or a blowing agent to leave pores of required size and to become effective at, or approximately at, the gelling temperature.

The gap at the lower part of the wall 28 of the hopper must be sufficient to allow the passage thereunder of the pattern of lines of plastic 20 on the carrier, and the gap at the lower part of the wall 29 of the hopper, or more precisely the gap of the adjustable doctor blade at the lower part of this wall 29, is sufficient to allow the thickness of the film 30 of the material 27 in the hopper to be "cast" on and above the pattern 20 of lines of the plastic paste originally laid from the extrusion head 16.

The thickness of the spread or film could be as desired and where the reinforcing filaments, for example, are of 0.010" diameter as set out above, this film could be 0.010" to 0.012" thick. Of course, the invention is not limited to this thickness as it could be greater or less, according to particular circumstances.

As will be appreciated, FIG. 1 shows these layers and thicknesses with greatly exaggerated dimensions.

After the film 30 cast on the pattern 20, by the continued movement of the carrier, leaves the hopper 26, it may pass to a heater 31 which would remove any thinning solvent that may have been used in the material 27 or which may still remain in the pattern 20, and then may pass to another heater 32 which will bring the film 30, and if required the pattern 20, to a condition ready for gelling, and finally to a heater 33 for effecting the gelling operation. After this the film 30 cast on and integrated with the pattern 20, continues its passage on the carrier 10. It may cool and solidify on this carrier before it is stripped therefrom, or the drying may be otherwise effected. To the right-hand side of FIG. 1 is shown the combined film 30 and pattern 20 as an integrated reinforced sheet of porous or microporous polyvinyl chloride or other polymer or co-polymer as it is stripped from the carrier 10 to pass to a take-up roller or otherwise; for instance, it can pass to a bath for leaching out the pore-forming agent.

Figure 3:
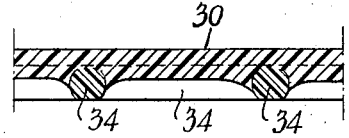

According to the exact arrangement of the heating zones 21, 22 and 23, it will be realised that the pattern 20 of lines, when it comes into the position to have cast thereon the material 27, can be what may be termed relatively hard, medium hard, or relatively soft. This will to some extent condition the type of the integration of the film 30 cast thereon, and FIGS. 3, 4 and 5, which are greatly enlarged views, show typical cross sections of the resulting reinforced film. In reference to FIG. 3, the reinforcements 34 are relatively hard and for example how they would be if the thinned paste 27 from which they are formed had been through the three heating stages, (a) to evaporate off any thinning solvent, (b) to pre-heat the paste to bring it into condition for jelling, and then (c) to heat higher elevation to jell the paste, and the under surfaces are somewhat flat due to their contact with the surface of the carrier. The porous or microporous film 30 is partly penetrated by the reinforcement 34, and it will be realised that this reinforcement does not unduly impede or interfere with the porosity through the film 30.

Figure 4:
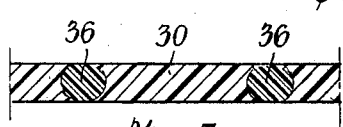

In FIG. 4, the reinforcement 35, being softer than the reinforcement 34 and for example, how it would be if the thinned paste 27 from which it is formed had been only through the two heating stages (a) to evaporate off the thinning solvent and (b) to pre-heat the paste to bring it into condition ready for jelling, spreads to some extent under the casting operation, and the film 30 merges to some extent to a greater degree around the reinforcement.

Figure 5:
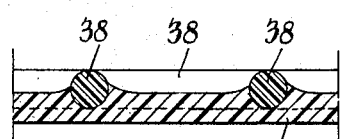
Figure 6:
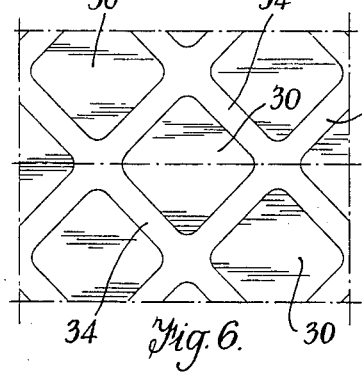
FIG. 6 is an under plan view of FIG. 3.

In FIG. 5, however, where the reinforcement 36 is comparatively soft, and for example, how it would be if the thinned paste 27 from which it is formed had been only through the single heating stage (a) to evaporate off the thinning solvent, it may entirely enter the film 30 and not project therefrom.

In any case it should be realised that the depth of the film 30 of paste having the pore-forming agent, may equal the "height" of the pattern 20 or be greater than this height. In any case, it will be realised that the flowed-on paste covers and enters, and wholly or partially fills, all the spaces of the pattern and readily adheres to and includes the pattern in its substance.

To indicate the presence of the reinforcing pattern, in some cases the composition of its paste could include a colouring agent not to be present in the paste with the pore-forming agent.

Although generally reinforced plastic sheets or films made in accordance with the invention can have the same pastes both for the pattern such as 20 and for the cast portion such as 30 (except for the pore-forming agent), in most cases the paste for the pattern should include in its composition a material or materials which tend to prevent flowing of the paste after laying. This effect may be achieved by use of a polymeric plasticiser (polypropylene adipate) in conjunction with an epoxy plasticiser (epoxidized vegetable oil or epoxidized mono-ester).

The pastes also can be otherwise different provided the two mixes are not incompatible. Again, a conventional paste may be used for the pattern and undue "flow" thereof after laying prevented by immediate gelling or an immediate pre-gelling heat treatment.

An example of a paste to be used for extrusion for forming the pattern and which does not "flow" unduly after laying, is:

| | Parts by weight |
|---|---|
| Polyvinyl chloride resin (paste-forming grade) | 100 |
| Polypropylene adipate | 16 |
| Epoxidized vegetable oil | 10 |
| Monomeric plasticiser (Methyl ester of hydrogenated abietic acid) | 16 |
| Titanium dioxide | 16 |
| Coloured pigments | 1.5 |
| Thinners (e.g. solvent naphtha) as required. | |

Although generally the film will be cast on the laid pattern, in some cases, according to a modification of the invention, a cast film, after a pre-gelling heat treatment, may have the openwork pattern of the paste laid thereon by extrusion, or otherwise, the whole subsequently being gelled.

Figure 8:
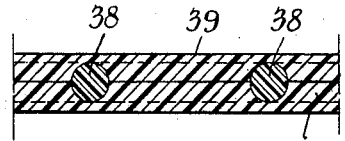

A greatly enlarged cross section (similar to the cross section of FIG. 3) of such a reinforced plastic sheet according to the invention, is shown in FIG. 8. Here the porous or microporous film 37 is cast directly on to the carrier and is then subjected to any necessary heat treatment such as a preliminary thinning solvent removal heating, and then a pre-gelling heat treatment, and upon the surface thereof is laid the pattern of reinforcement, such reinforcement being indicated by 38 in FIG. 8. To some extent the resulting material resembles that shown in FIG. 3.

Figure 9:
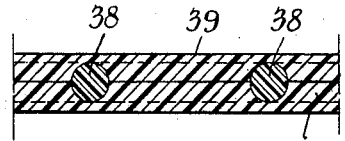

In other cases, and as shown in FIG. 9, before the gelling, the film 37 subjected to a pre-gelling heat and with the pattern 38 laid thereon, could have another film 39 with the blowing agent therein cast on the laid patterned surface 38, the "sandwich" of two films with a patterned spread between, as a whole, then being subjected to the gelling treatment.

Sheets or films according to the invention can be laminated with a textile fabric of desired porosity. For this purpose, at a stage after the casting stage and before gelling, the fabric can be pressed lightly on to the exposed surface of the sheet or film, for the surface of the fabric slightly to penetrate below the surface of the film, the laminate then passing on through the further stages of manufacture, which obviously will be modified to allow for the presence of the textile fabric.

Figure 7:
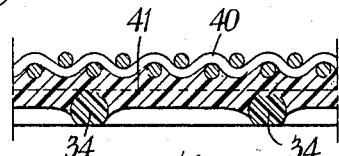
FIGS. 7, 8 and 9 show similar views to FIG. 3 of other reinforced cast plastic sheets made according to the invention.

An example of such a fabrication is shown to a greatly enlarged scale in FIG. 7, where 40 illustrates the fabric which has been lightly pressed into the porous or microporous film 41 at the requisite stage of manufacture.

The invention is not limited to the precise forms or details herein set forth, as these may be varied to suit particular requirements.

What I claim is:

1. A method of forming a re-inforced, porous, cast and gelled film having extruded reinforcing strand-like lines, said film being formed of a polymerised synthetic resin capable of being gelled, comprising the steps of laying a spread of individually extruded spaced fine lines of a paste of the polymerised synthetic resin thinned by a solvent in the form of an openwork pattern on the surface of a flexible traveling band carrier with the spread of strand-like fine lines extending diagonally thereof, subjecting the pattern spread of lines on the carrier to a heat treatment at an elevated temperature to evaporate-off the thinning solvent but not to gell the said spread of lines, immediately casting on the heated pattern spread of lines on the carrier a film of solvent thinned paste of a compatible polymerised synthetic resin capable of being gelled and which paste includes a pore-forming blowing agent adapted to be blown at the gelling temperature of the paste in which it is included, in such a manner that said film embeds the patterned spread of lines at least to a major portion of the thickness in depth of said lines, subjecting the re-inforced film thus formed to another heat treatment to evaporate off the thinning solvent and to gell the film and embedded pattern spread of lines and also to decompose any blowing agent and allowing the re-inforced film to cool and set.

2. A method of forming a re-inforced, porous, cast and gelled film having extruded reinforcing strand-like lines, said film being formed of a polymerised synthetic resin capable of being gelled, comprising the steps of laying a spread of a series of individually extruded spaced fine lines of a paste of the polymerised synthetic resin thinned by a solvent in the form of an openwork pattern onto a flexible traveling band carrier, subjecting the patterned spread of fine lines on the carrier to a heat treatment at a temperature to evaporate-off the thinning solvent and to gell said spread of fine lines, immediately casting on the heated patterned spread of fine lines a film of solvent-thinned paste of a compatible polymerised synthetic resin capable of being gelled and which includes a suitable pore forming blowing agent adapted to be blown at the jelling temperature of the paste in which it is included, said film being applied so that it embeds the patterned spread of fine lines at least to a major portion of the thickness in depth of said lines, subjecting the re-inforced film thus formed to a second heat treatment to evaporate off the thinning solvent and to gell the film and also to decompose any blowing agent employed to form the pores, allowing the re-inforced film to cool and set.

3. A method of forming a re-inforced porous cast and gelled film having extruded reinforcing strand-like lines, said film being formed of a polymerised synthetic resin capable of being gelled, comprising the steps of laying a spread of a series of individually extruded spaced fine filaments of a solvent-thinned paste of the polymerised synthetic resin, said paste including in its composition a polymeric plasticiser in conjunction with an epoxy plasticiser tending to prevent the flowing of the paste after laying in the form of an openwork pattern onto a flexible traveling band carrier, subjecting the pattern spread of the lines on the carrier to a heat treatment at a temperature to evaporate-off the thinning solvent and to gell said spread of filaments immediately casting on the heated patterned spread of filaments on the carrier a film of solvent-thinned paste of a compatible polymerised synthetic resin capable of being gelled and which includes a pore-forming blowing agent in such a manner that said film embeds the patterned spread of filaments at least to a major proportion of the thickness in depth of said filaments, subjecting the re-inforced film thus formed to a second heat treatment to evaporate off the thinning solvent and to gell the film as well as to decompose any pore forming blowing agent employed to form the pores, allowing the re-inforced film to cool and set.

4. A method of forming a re-inforced porous cast and gelled film having extruded reinforcing strand-like lines, said film being formed of polyvinyl chloride, comprising the steps of laying a spread of individually extruded spaced fine lines of a paste consisting of:

| | Parts by weight |
|---|---|
| Polyvinyl chloride resin (paste-forming grade) | 100 |
| Polypropylene adipate | 16 |
| Epoxidized vegetable oil | 10 |
| Monomeric plasticiser (Methyl ester of hydrogenated abietic acid) | 16 |
| Titanium dioxide | 16 |
| Coloured pigments | 1.5 |
| Thinners (e.g. solvent naphtha) as required. | | in the form of an openwork pattern onto the surface of a flexible traveling band carrier, subjecting the patterned spread of lines on the carrier to an elevated heat treatment at a temperature to evaporate-off the thinning solvent and to gell said spread of lines, immediately casting onto the still heated patterned spread of lines on the carrier a film of solvent-thinned paste of a compatible polymerised synthetic resin capable of being gelled and which paste also includes a pore-forming blowing agent adapted to be blown at the jelling temperature of the paste in which it is included in such a manner that the film embeds the patterned spread of lines at least to a major proportion of the thickness in depth of said lines, subjecting the re-inforced film thus formed to a second heat treatment to evaporate-off the thinning solvent and gell the film and also to decompose any remaining blowing agent to form the pores, and finally allowing the re-inforced film to cool and set.

References Cited by the Examiner

UNITED STATES PATENTS

| 2,413,970 | 1/1947 | Hawley | 154—48 |
| 2,502,514 | 4/1950 | Ewer. | |
| 2,801,949 | 8/1957 | Bateman | 156—247 |
| 2,813,052 | 11/1957 | Lancaster | 154—50 |
| 2,894,855 | 7/1959 | Wilhelm et al. | |
| 2,979,480 | 4/1961 | Piloni et al. | 260—41 |
| 2,984,869 | 5/1961 | Honey et al. | 264—49 |

FOREIGN PATENTS 17,549    1898    Great Britain.

EARL M. BERGERT, *Primary Examiner.*

CARL F. KRAFFT, *Examiner.*

M. Q. TATLOW, H. L. GATEWOOD, T. R. SAVOIE,
*Assistant Examiners.*